(12) United States Patent
Moons

(10) Patent No.: US 8,119,176 B2
(45) Date of Patent: *Feb. 21, 2012

(54) THERMOPLASTIC POLYMERIC OVENWARE

(75) Inventor: Roger Moons, Duffel (BE)

(73) Assignee: E. I. Du Pont de Nemours and Company, Wilmington, DE (US)

( * ) Notice: Subject to any disclaimer, the term of this patent is extended or adjusted under 35 U.S.C. 154(b) by 777 days.

This patent is subject to a terminal disclaimer.

(21) Appl. No.: 10/627,902

(22) Filed: Jul. 25, 2003

(65) Prior Publication Data

US 2004/0132887 A1 Jul. 8, 2004

Related U.S. Application Data

(60) Provisional application No. 60/398,898, filed on Jul. 26, 2002, provisional application No. 60/424,166, filed on Nov. 6, 2002.

(51) Int. Cl.
*A47J 36/04* (2006.01)

(52) U.S. Cl. ..... 426/107; 426/109; 426/113; 220/573.1; 428/367; 423/447.2

(58) Field of Classification Search .......... 426/109, 426/112, 113, 389, 523, 107; 99/426, 447, 99/DIG. 15; 220/573.1–573.2; 252/299.01–299.7; 428/367; 423/447.1–447.2

See application file for complete search history.

(56) References Cited

U.S. PATENT DOCUMENTS

| | | | | | |
|---|---|---|---|---|---|
| 4,265,968 | A | * | 5/1981 | Prewo | 428/336 |
| 4,503,168 | A | | 3/1985 | Hartsing, Jr. | |
| 4,541,411 | A | * | 9/1985 | Woolf | 126/390.1 |
| 4,563,488 | A | | 1/1986 | Minami | |
| 4,585,823 | A | | 4/1986 | Saito et al. | |
| 4,626,557 | A | | 12/1986 | Duska et al. | |
| 4,714,734 | A | * | 12/1987 | Hashimoto et al. | 524/496 |
| 4,922,811 | A | * | 5/1990 | Stumpf | 99/443 C |
| 4,959,516 | A | * | 9/1990 | Tighe et al. | 219/730 |
| 5,028,461 | A | * | 7/1991 | Nakamichi | 428/34.5 |
| 5,141,985 | A | | 8/1992 | Asai et al. | |
| 5,183,643 | A | * | 2/1993 | Nichols | 422/297 |
| 5,229,563 | A | * | 7/1993 | Isogai et al. | 219/735 |
| 5,308,913 | A | | 5/1994 | Asai et al. | |
| 5,486,683 | A | * | 1/1996 | Shimizu et al. | 219/622 |
| 5,529,716 | A | * | 6/1996 | Nomura et al. | 252/299.01 |
| 5,976,406 | A | * | 11/1999 | Nagano et al. | 252/299.01 |
| 6,326,599 | B1 | * | 12/2001 | Pickford | 219/725 |
| 6,346,568 | B1 | * | 2/2002 | Maeda et al. | 524/495 |
| 6,495,616 | B2 | * | 12/2002 | Maeda | 523/219 |
| 6,641,878 | B2 | * | 11/2003 | Suzuki et al. | 428/35.7 |
| 6,815,486 | B2 | * | 11/2004 | Bhagwagar et al. | 524/430 |
| 6,830,769 | B2 | * | 12/2004 | Meroni | 426/512 |
| 2003/0047712 | A1 | * | 3/2003 | Maeda et al. | 252/299.64 |
| 2006/0014876 | A1 | * | 1/2006 | Bushelman et al. | 524/439 |

FOREIGN PATENT DOCUMENTS

| | | |
|---|---|---|
| EP | 494 422 | 7/1992 |
| EP | 0 846 419 A1 | 6/1998 |
| WO | WO 94/05728 | 3/1994 |
| WO | WO 98/48414 * | 10/1998 |
| WO | WO 01/34702 A2 | 5/2001 |
| WO | WO 01/34702 A2 * | 5/2001 |

OTHER PUBLICATIONS

Nippon Steel Technical Report No. 84, Jul. 2001, Pitch-Based Carbon Fiber with Low Modulus and High Heat Conduction.*
Patent Abstracts of Japan, 61181847, published Aug. 14, 1986, Dainichi Seika Kogyo KK, Thermally Conductive Resin Composition and Thermally Conductive Molding.

* cited by examiner

*Primary Examiner* — Drew E Becker
(74) *Attorney, Agent, or Firm* — Dority & Manning, P.A.

(57) ABSTRACT

Ovenware made from thermoplastic polymeric compositions which have relatively high thermal conductivities has advantages in cooking food. Such compositions can be made by mixing a thermoplastic polymer with a particulate material which has a relatively high thermal conductivity. This composition usually allows faster heating of the food and/or improved browning of the food in contact with the ovenware surface.

8 Claims, No Drawings

THERMOPLASTIC POLYMERIC OVENWARE

CROSS REFERENCE TO RELATED APPLICATIONS

This application claims the benefit of U.S. Provisional Application No. 60/398,888, filed Jul. 26, 2002, and U.S. Provisional Application No. 60/424,166, filed Nov. 6, 2002.

FIELD OF THE INVENTION

Ovenware made from thermoplastic polymeric compositions which have relatively high thermal conductivities has advantages in cooking food. Such compositions can be made by mixing a thermoplastic polymer with a material which has a relatively high thermal conductivity.

TECHNICAL BACKGROUND

Cooking food is one of the oldest human activities still practiced today. Cooking has evolved from simply heating over a fire to using various types of containers (cooking pots, frying pans, baking tins, crock pots, double boilers, etc.) in convection ovens which are heated by electricity or gas. A number of different types of materials having high temperature resistance have been used for these containers, the most common presently being metal. People have become used to cooking in metal containers, both for the methods of cooking used and the taste and texture of the foods produced.

In the last 20 years or so, as thermoplastic polymers (TPs) having better high temperature resistance have been developed, the use of these polymers for ovenware has been proposed, see for instance U.S. Pat. Nos. 4,626,557, 4,503,168, 4,585,823, 5,308,913, and 5,141,985, and European Patent Application 846,419, all of which are hereby included by reference. These polymeric cooking containers can be used in thermal ovens and often can withstand the highest temperatures usually used in these ovens, for example about 290° C. (~550° F.) or more. These containers have the advantage of being molded into practically any shape, may be containers that are easily sealed so the contents can be refrigerated or frozen, and are relatively low in weight. However when cooking food in these containers the cooking method (time and/or temperature for example) may have to be varied from the method used for a metal container, and/or the food may not have the same taste and/or texture. For example bread or a casserole baked in a plastic container may not be browned on the outside surface which is in contact with the cooking container surface as it is in a metal container. This is primarily due to the fact that polymers in general tend to have very low thermal conductivities, especially when compared to metals. Thus a TP cooking container which behaved more like a metal container would be desirable.

SUMMARY OF THE INVENTION

This invention concerns, an ovenware item comprising a thermoplastic polymer composition, wherein said thermoplastic polymer composition has a through plane thermal conductivity of 1.0 watt/m° K or more.

This invention also concerns a process for cooking food, wherein a container which holds or supports the food while cooking comprises a thermoplastic polymer composition, wherein said thermoplastic polymer composition has a through plane thermal conductivity of 1.0 watt/m° K or more.

DETAILS OF THE INVENTION

The composition herein contains a TP. Such polymers may be reformed by melting the thermoplastic and then cooling it below its melting point and/or glass transition temperature. Such polymers are not crosslinked. Generally TPs have a melting point and/or glass transition temperature above 30° C., when measured by differential scanning calorimetry, with the melting point being taken as the peak of the melting endotherm, and the glass transition temperature as the middle of the transition. Such measurements can be done following ASTM method D3418.

The TPs useful in the present invention should preferably have sufficient thermal resistance so that they can be used at temperatures ordinarily found in cooking ovens. Notwithstanding the definition of TP above, preferably they should have a melting point and/or glass transition point of 200° C. or more, more preferably about 250° C. or more, and especially preferably about 300° C. or more.

Useful thermoplastics include polyolefins; polyesters such as poly(ethylene terephthalate), poly(1,4-butylene terephthalate) and poly(1,3-propylene terephthalate); polyamides such as nylon-6 and nylon-6,6; polyethers such as poly(phenylene oxides); polycarbonates; poly(ether-sulfones); poly(ether-imides); polysulfides such as poly(p-phenylene sulfide); liquid crystalline polymers (LCPs) such as aromatic polyesters, poly(ester-imides), and poly(ester-amides); poly(ether-ether-ketones); poly(ether-ketones); fluoropolymers such as polytetrafluoroethylene, a copolymer of tetrafluoroethylene and perfluoro(methyl vinyl ether), and a copolymer of tetrafluoroethylene and hexafluoropropylene; and mixtures and blends thereof.

A preferred type of TP is an LCP. By a "liquid crystalline polymer" is meant a polymer that is anisotropic when tested using the TOT test or any reasonable variation thereof, as described in U.S. Pat. No. 4,118,372, which is hereby included by reference. Useful LCPs include polyesters, poly(ester-amides), and poly(ester-imides). One preferred form of polymer is "all aromatic", that is all of the groups in the polymer main chain are aromatic (except for the linking groups such as ester groups), but side groups which are not aromatic may be present.

The thermal conductivities of most TPs, including those types listed above, is generally <<1 watt/m° K. This thermal conductivity can be raised by mixing the TP with a particulate material (filler) which itself has a relatively high thermal conductivity. Useful fillers include (approximate thermal conductivities in parentheses) graphite (including carbon black) (50-200, varies widely), MgO (60), BeO (200), alumina (45-150), Zinc oxide (28), MgO 3.5Al$_2$O$_3$ (125), CaF$_2$ (700), and SiC (~100-500). Preferred supports are graphite (including carbon black), MgO, alumina, and MgO 3.5Al$_2$O$_3$, and carbon black and graphite are especially preferred. These thermal conductivities are those at about 273° K, and are taken from Y. S. Touloukian, et al., Thermophysical Properties of Matter, Vol. 2, IFI/Plenum, New York, 1970. More than one such filler may be used. Preferably this filler has an inherent (not bulk) thermal conductivity of about 50 watt/m° K or more.

Preferably the filler(s) should be relatively small particles, typically the largest dimension for a particulate material being less (number average) than about 500 μm, and if fibrous the length being less (number average) than 1 mm, which are reasonably uniformly dispersed in the TP. They may be mixed into the TP using standard melt mixing techniques and equipment, such as single or twin screw extruders. These number average particle sizes are the primary particle sizes of the filler (not agglomerated sizes) and may be measure by an appropriate form of microscopy (for instance optical microscopy or electron microscopy), and the use of appropriate imaging software for calculating the particle sizes.

The thermal conductivity of the composition must be 1 watt/m° K or more, preferably about 2 watt/m° K or more, more preferably about 3 watt/m° K or more, and especially preferably about 5 watt/m° K or more. The TP(s) is preferably present as a continuous phase in the composition. Typically the high thermal conductivity filler is about 5 to about 65% by weight of the composition. The thermal conductivity of the composition is measured through the plane (thinnest cross section) of a test part or piece of ovenware, using ASTM Method 5930.

The thermal conductivity of polymer compositions previously described for ovenware is typically quite low. For instance, using the same LCP used in Examples 1-4 below, a composition containing 51.6% LCP, 13% of a blue pigment concentrate in the LCP, 35% talc and 0.56% Ultranox® antioxidant (all percentages are by weight of the total composition) was made and molded into a disc. At 100° C. the through the plane of the disc heat conductivity was 0.40 W/m° K.

The composition may contain other ingredients typically added to thermoplastics, such as fillers, reinforcing agents, plasticizers, flame retardants, antioxidants, antiozonants, and lubricants, in the amounts usually used for such compositions. These additives may affect the thermal conductivity, and the thermal conductivity limitations must still be met.

The composition may be formed into ovenware (for cooking food), such as pans, pots of various size and shapes such as square, round, rectangular, octagonal with sloping or vertical sides, flat pans such as pizza pans, casserole-type dishes, bread pans, cake pans, and muffin pans. Covers for these vessels may be formed from the same material or may be other materials if they do not need thermal conductivity and/or be placed in the oven. This ovenware may be used singly, for example in a residential kitchen, or multiply, for example in a commercial plant for baking bread or cakes. Ovenware from this composition will be formed by typical forming techniques used for TPs such as melt injection molding, melt compression molding, thermoforming, blow molding, and rotomolding. Injection molding is a preferred method of melt forming. Typically the part formed with injection molding, compression molding, and rotomolding is a one piece (monolithic) part, while parts formed by thermoforming or blow molding may be layered or monolithic. Preferably the ovenware part is a one piece (monolithic) part. Also preferably in the ovenware part made from the present composition, the food is in direct contact with the TP containing composition while the food is being heated (cooked).

These ovenware pieces may be coated on one, some or all surfaces with a release coating such as a perfluoropolymer, particularly polytetrafluoroethylene, a copolymer of tetrafluoroethylene and perfluoro(methyl vinyl ether), or a copolymer of tetrafluoroethylene and hexafluoropropylene.

The ovenware parts described herein may also be used in convection ovens to heat items other than food, for example water, cooking oil, candle wax and beeswax.

In Examples 1-4 the LCP used was the same composition as LCP-4 of U.S. Pat. No. 5,110,896, which is hereby included by reference. The carbon fiber (CF) used was Panex® 33CF carbon fiber (available from Zdtek Corp.), the glass fiber used (GF) was Owens Corning grade 408 (Owens Corning Fiberglass, Toledo, Ohio USA), and the other carbon fiber used, CF300 is a pitch carbon fiber available from Conoco, Inc., Houston, Tex. USA.

Tensile strength and elongation were measured by ASTM Method D638, Flexural modulus and strength were measured by ASTM Method D790, and thermal conductivity (through the plane of the test piece) was measured by ASTM Method D5930.

The LCP samples were made by melt mixing the ingredients shown in Table 1 (amounts shown are percentages by weight of the total composition) in a 30 mm Werner & Pfleiderer twin screw extruder, with the barrel set at 340-350° C. The extruded strands were cooled and chopped into pellets. The pellets were injection molded into plaques and test pieces, and the testing results are shown in Table 1. The thermal conductivity was measured through the thickness of the plaques.

TABLE 1

| Ex. | % LCP | % CF300 | % Glass | % CF | Thermal Conductivity W/m° K | Tensile Strength (MPa) | % Tensile Elong. | Flex Modulus (GPa) | Flex Strength (MPa) |
|---|---|---|---|---|---|---|---|---|---|
| 1 | 40 | 60 | 0 | 0 | 2.65 | 45.7 | 0.76 | 9.31 | 11.5 |
| 2 | 35 | 55 | 0 | 10 | 3.17 | 47.8 | 0.47 | 14.5 | 12.2 |
| 3 | 35 | 55 | 10 | 0 | 3.27 | 56.8 | 0.67 | 13.8 | 13.4 |
| 4[a] | 31 | 51 | 9 | 0 | 3.60 | 53.6 | 0.51 | 14.6 | 12.6 |

[a] Also contains 9 weight percent CF300 ground to a fine powder.

What is claimed is:

1. An article comprising a thermoplastic polymer composition, wherein said thermoplastic polymer composition comprises a liquid crystalline polymer, and a mixture of carbon fibers and glass fibers, the carbon fibers having a thermal conductivity of about 50 W/m° K or more, wherein the carbon fibers are present in an amount greater than the liquid crystalline polymer, and the liquid crystalline polymer is present in an amount greater than the glass fibers, and further wherein the carbon fibers and glass fibers are present in the thermoplastic polymer composition in amounts sufficient for the composition to have a through plane thermal conductivity of 3.0 watt/m° K or more, wherein the article comprises ovenware.

2. The article as recited in claim 1, wherein a thermoplastic in said thermoplastic polymer composition has one or both of a melting point and glass transition temperature of about 250° C. or more.

3. The article as recited in claim 1, wherein said thermoplastic polymer composition has one or both of a melting point and glass transition temperature of about 250° C. or more, and said thermoplastic composition also comprises other ingredients selected from the group consisting of fillers, reinforcing agents, plasticizers, flame retardants, antioxidants, antiozonants, and lubricants, in amounts conventionally used for such a polymer composition.

4. The article as recited in claim 1, wherein the carbon fibers have a number average length of less than 1 mm.

5. The article as recited in claim 1, wherein the ovenware comprises a pizza pan, a casserole dish, a bread pan, a cake pan, or a muffin pan.

6. The article as recited in claim 1, wherein the liquid crystalline polymer is present in the composition in an amount of 40% or less by weight.

7. The article as recited in claim 6, wherein the carbon fibers are present in the composition in an amount of from 55% to about 60% by weight.

8. The article as recited in claim 1, wherein the carbon fibers are pitch carbon fibers.

* * * * *